(12) United States Patent
Aflatouni et al.

(10) Patent No.: US 10,848,739 B2
(45) Date of Patent: Nov. 24, 2020

(54) COHERENT CAMERA

(71) Applicant: California Institute of Technology, Pasadena, CA (US)

(72) Inventors: Firooz Aflatouni, Pasadena, CA (US); Behrooz Abiri, Pasadena, CA (US); Seyed Ali Hajimiri, La Canada, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 542 days.

(21) Appl. No.: 14/027,119

(22) Filed: Sep. 13, 2013

(65) Prior Publication Data

US 2014/0071249 A1 Mar. 13, 2014

Related U.S. Application Data

(60) Provisional application No. 61/700,722, filed on Sep. 13, 2012.

(51) Int. Cl.
*H04N 13/211* (2018.01)
*H04N 13/254* (2018.01)
(Continued)

(52) U.S. Cl.
CPC ......... *H04N 13/211* (2018.05); *G03H 1/0406* (2013.01); *G03H 1/0443* (2013.01);
(Continued)

(58) Field of Classification Search
CPC ............... G03H 1/0406; G03H 1/0443; G03H 2001/0419; G03H 2001/0428; G03H 2001/0452
(Continued)

(56) References Cited

U.S. PATENT DOCUMENTS 5,083,015 A * 1/1992 Witthoft ................. G02B 26/06
250/201.9
5,106,192 A * 4/1992 Tucker ................... G01S 17/325
356/477
(Continued)

FOREIGN PATENT DOCUMENTS

JP 10132530 A * 5/1998
JP 2000-333206 A 11/2000
(Continued)

OTHER PUBLICATIONS

International Search Report for PCT Application No. PCT/US2013/059823 dated Dec. 23, 2013.
(Continued)

*Primary Examiner* — Jeremiah C Hallenbeck-Huber
(74) *Attorney, Agent, or Firm* — Alston & Bird LLP

(57) ABSTRACT

A camera includes, in part, an optical signal source generating a frequency varying optical signal, a multitude of pixels arranged along rows and columns, an optical focusing element, and an opto-electronic circuit. A portion of the optical signal generated by the optical signal is caused to reflect from a target object and then directed toward the pixels. A multitude of samples of a second portion of the optical signal are combined with the signals received by the pixels to generate a multitude of combined optical signals. The optical signals so combined are converted to electrical signals. Each electrical signal has a frequency defined by a difference between a frequency of the second portion of the optical signal and a frequency of a signal received from a pixel. The frequency differences are used to form an image of the target object.

24 Claims, 4 Drawing Sheets

(51) Int. Cl.
  *H04N 13/271* (2018.01)
  *H04N 13/207* (2018.01)
  *G03H 1/04* (2006.01)
(52) U.S. Cl.
  CPC ......... *H04N 13/207* (2018.05); *H04N 13/254* (2018.05); *H04N 13/271* (2018.05)
(58) Field of Classification Search
  USPC .............................................. 348/49; 359/35
  See application file for complete search history.

(56) References Cited

U.S. PATENT DOCUMENTS

| | | | |
|---|---|---|---|
| 5,436,462 | A | 7/1995 | Hull-Allen |
| 5,544,268 | A * | 8/1996 | Bischel ................... G02F 1/011 385/16 |
| 5,710,621 | A * | 1/1998 | Tamura ................. G01S 17/325 342/118 |
| 7,355,716 | B2 * | 4/2008 | de Boer ............... A61B 5/0059 356/479 |
| 2005/0140982 | A1 | 6/2005 | Chen et al. |
| 2006/0132790 | A1 * | 6/2006 | Gutin ................... A61B 5/0066 356/479 |
| 2006/0227316 | A1 * | 10/2006 | Gatt ...................... G01S 7/4811 356/5.09 |
| 2009/0046296 | A1 * | 2/2009 | Kilpatrick .............. G01H 9/004 356/484 |
| 2010/0045966 | A1 | 2/2010 | Cauquy et al. |
| 2010/0244270 | A1 * | 9/2010 | Asami ..................... H01L 24/83 257/773 |
| 2011/0063733 | A1 * | 3/2011 | Yeo .................... G02B 27/1073 359/629 |
| 2011/0134436 | A1 * | 6/2011 | Podoleanu ........... A61B 3/1015 356/512 |
| 2012/0093459 | A1 * | 4/2012 | Mathai ................. G02B 6/2852 385/24 |
| 2013/0063729 | A1 * | 3/2013 | Iwai ........................ G01N 21/41 356/486 |
| 2013/0100241 | A1 * | 4/2013 | Sato ....................... G02B 21/06 348/40 |
| 2016/0206193 | A1 * | 7/2016 | Schmoll ............. G01B 9/02004 |

FOREIGN PATENT DOCUMENTS

| | | |
|---|---|---|
| KR | 10-0406169 B1 | 11/2003 |
| WO | 2014/043587 A1 | 3/2014 |

OTHER PUBLICATIONS

PCT Written Opinion of the International Search Authority for application PCT/US2013/059823 dated Dec. 23, 2013.
PCT International Preliminary Report on Patentability for application PCT/US2013/059823 dated Mar. 17, 2015.

* cited by examiner

COHERENT CAMERA

CROSS-REFERENCES TO RELATED APPLICATIONS

The present application claims benefit under 35 USC 119(e) of U.S. provisional application No. 61/700,722, filed Sep. 13, 2012, entitled "Coherent Camera", the content of which is incorporated herein by reference in its entirety.

BACKGROUND OF THE INVENTION

A number of conventional techniques exist to capture a 3D image of an object. In accordance with one such technique, to form a 3D picture of an object, two or more images of the object are captured from slightly different vantage points or angels. The pictures, which may be taken using two distinct lenses to form two separate images on two image sensors, or on different areas of a photograph film, provide the spatial displacement and depth necessary to recreate the three dimensional visual effect.

BRIEF SUMMARY OF THE INVENTION

A camera in accordance with one embodiment of the present invention includes, in part, an optical signal source generating a time varying optical signal, a multitude of pixels arranged along N rows and M columns where M and N are integer numbers, an optical focusing element adapted to focus a reflected signal toward the pixels to enable the pixels receive the reflected signal, and an opto-electronic circuit adapted to combine a second portion of the optical signal with the signals received by at least a subset of the pixels to generate data representative of an image of the target object. The reflected signal is generated by causing a reflection of a first portion of the optical signal from the target object.

In accordance with one embodiment the camera further includes, an optical system adapted to direct the first portion of the optical signal toward the target object. In one embodiment the optical signal source is a laser. In on embodiment, the opto-electronic circuit includes, in part, a multitude of splitters adapted to generate a multitude of samples of the second portion of the optical signal, and a multitude of combiners each adapted to combine a sample of the second portion of the optical signal with a signal received from a different one of the pixels to generate a multitude of combined optical signals.

In one embodiment, the camera further includes, in part, a multitude of opto-electronic components each associated with a different one of the combiners and a different one of the pixels and adapted to convert the combined optical signal it receives from its associated combiner to an electrical signal. In one embodiment, each opto-electronic component is a photo-diode adapted to generate a current signal whose frequency is defined by a difference between a frequency of the second portion of the optical signal and a frequency of the signal the photo-diode receives from its associated pixel.

In one embodiment, the camera further includes, in part, a signal processing system adapted to determine data representative of the image of the target object by comparing the frequencies of the current signals generated by the photodiodes. In one embodiment, each photodiodes is adapted to filter out high frequency components of the signals it receives. In one embodiment, the camera further includes, in part, an optical path adapted to deliver the second portion of the optical signal to the optical system.

In one embodiment, the pixels, splitters, combiners, optoelectronic components and the signal processing system are formed on a semiconductor substrate. In one embodiment, the optical signal source is also formed on the semiconductor substrate. In one embodiment, the image captured by the camera is a 3-D image. In one embodiment, the optical signal generated by the optical signal source has a variable frequency.

A method of forming an image of a target object, in accordance with one embodiment of the present invention, includes, in part, generating a time varying optical signal, directing a first portion of the optical signal toward the target object to generate a reflected optical signal, focusing the reflected optical signal onto a multitude of pixels positioned along rows and columns to enable the pixels receive the reflected optical signal, and combining a second portion of the optical signal with the signals received by at least a subset of the pixels thereby to generate data representative of the image of the target object.

In one embodiment, the method further includes, in part, generating the time varying optical signal using a laser. In one embodiment, the method further includes, in part, generating a multitude of samples of the second portion of the optical signal, and combining each sample of the second portion of the signal with a different one of signals received by the pixels thereby to generate a multitude of combined optical signals. In one embodiment, the method further includes, in part, converting the combined optical signals to electrical signals.

In one embodiment, the frequency of each electrical signal is defined by a difference between a frequency of the second portion of the optical signal and a frequency of the signal received from an associated pixel. In one embodiment, the method further includes, in part, comparing the plurality of frequencies of the electrical signals to form the data representative of the image of the target object.

In one embodiment, the method further includes, in part, filtering out high frequency components of the electrical signals. In one embodiment, the method further includes, in part, delivering the first portion of the optical signal toward the target object via an optical system. In one embodiment, the method further includes, in part, generating the optical signal using an optical source formed on a semiconductor substrate, and forming the on the semiconductor substrate. In one embodiment, the pixels are formed on a semiconductor substrate using a silicon-on-insulator process.

DETAILED DESCRIPTION OF THE INVENTION

A coherent camera, in accordance with one embodiment of the present invention, captures data representative of both amplitude and phase of optical signals emitted from the object being viewed. Since both the amplitude and phase are captured, electronically controlled fast segment-selective zooming may be performed in creating different image sizes associated with objects positioned at different distances. The coherent camera may be used in numerous applications, such as mono-static and bi-static radars, phased array receivers, range and velocity sensors, Doppler shift detection systems, scanning systems, games, optical communication systems, electronically controlled ultra-fast focus, phased array based detection, object tracking, velocity detection, ranging, phase contrast imaging, and the like.

Figure 1:
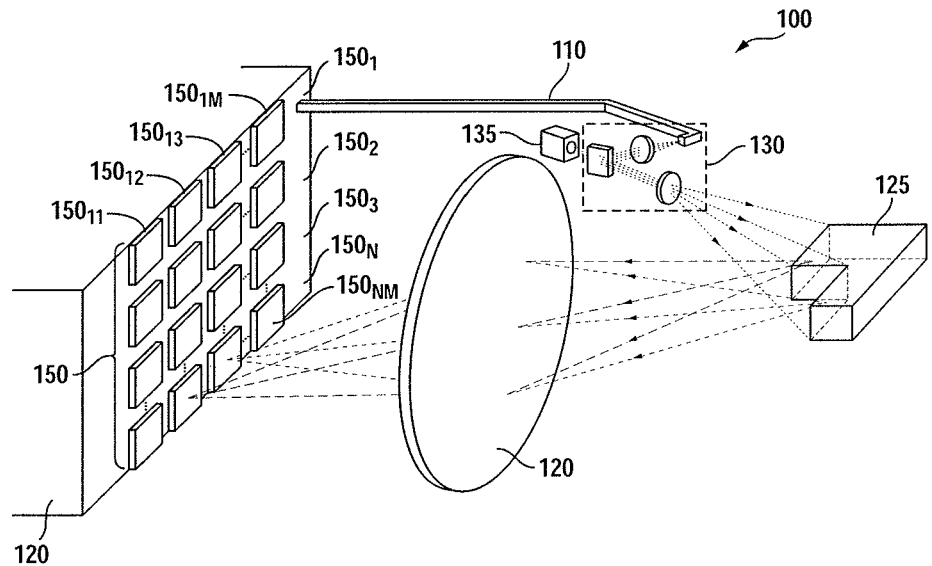
FIG. 1 is a simplified schematic diagram of a coherent camera, in accordance with one embodiment of the present invention.

FIG. 1 is a simplified schematic diagram of a coherent camera 100, in accordance with one embodiment of the present invention. Coherent camera 100 is shown as including, in part, an array of pixels 150, a coherent signal source 135, an optical system 130, and an optical focusing element 120. The optical focusing element 120 may be a lens and is referred to as such hereinafter. Pixel array 150 is formed on, for example, a semiconductor substrate 120, and includes N×M array of pixels arranged along N rows and M columns. For example, row 1 is shown as including pixels $150_{11}$, $150_{12} \ldots 150_{1M}$. In the following description, pixel $150_{ij}$ is understood to refer to a pixel disposed in row i and column j of array 150. Coherent camera 100 also includes a multitude of Y-junctions, combiner arrays, photodiodes, and a control/processing circuitry formed in substrate 220, as shown in detail in FIGS. 2 and 3.

Signal source 135, which may be a laser, generates a coherent signal. The frequency of the signal generated by signal source 135 is chirped so as to increase or decrease with time, either linearly or non-linearly. The signal generated by light source 135 is split into at least two parts by optical system 130. A first portion of the light so split is directed toward target object 125 via optical system 130, reflects off the various surfaces of object 125 and is focused by lens 120 toward pixel array 150. A second portion of the light so split, hereinafter referred to as the reference signal, is directed towards coherent camera 100 via optical path 110. As is described further below, the amplitudes associated with the image of the target object being formed is captured by the intensity of the reflected signal and the depth of the image being formed in each pixel is captured by correlating the reference signal with the signal received by that pixel, as described further below.

Signals that are reflected from different points of target object 125 with different depths experience different time delays as they arrive and get captured by the pixels. Therefore, as the frequency of light source 135 is chirped, signals received by the pixels from different points of object 125 with different depths, will have different optical frequencies.

By correlating the signal received at each pixel with the reference signal, different electrical frequencies associated with different pixels are detected. The frequencies so detected provide information about the positions and depths of various points of target object 125 relative to the camera, thereby providing a 3D image of the object.

Figure 2:
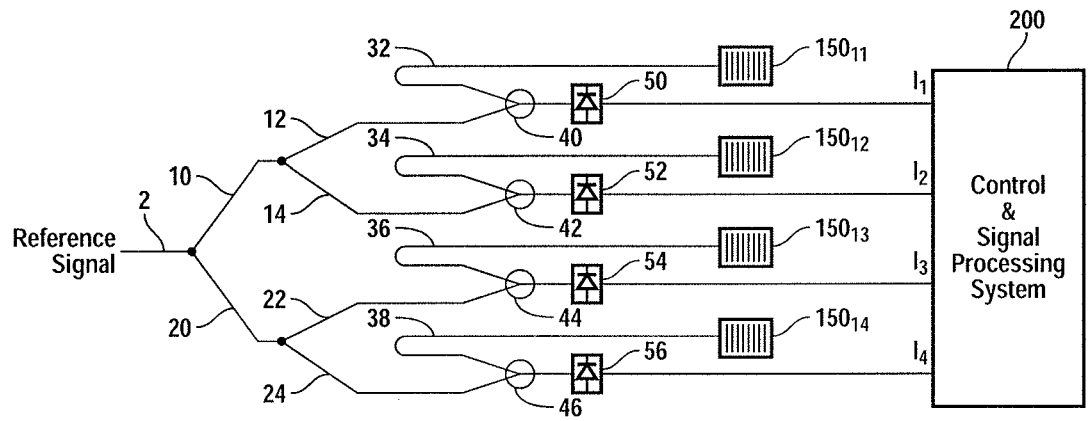
FIG. 2 is a simplified view of a multitude of components and signal paths disposed in the coherent camera of FIG. 1, in accordance with one embodiment of the present invention.

FIG. 2 is a simplified view of a multitude of components and signal paths formed in substrate 120 and disposed in coherent camera 100 (not shown in FIG. 1). Only the paths associated with four of the pixels, namely pixels $150_{11}$, $150_{12}$, $150_{13}$, and $150_{14}$ are shown. Although not shown, it is understood that substrate 120 includes similar paths, optical combiners, and photodiodes associated with each pixels $150_{ij}$, where i is an index ranging from 1 to N, and j is an index ranging from 1 to M. Each pixel in array 150 includes a grating coupler having a multitude of grooves. When an optical signal strikes the camera lens, it is caused to pass through the gratings and subsequently combine with the various samples of reference signal in the combiners. For example, the optical signal received by pixel $150_{11}$ is directed to combiner 40 via optical signal path 32. Combiner 40 receives a portion of the reference signal via paths 10 and 12. Likewise, combiner 44 is adapted to combine the optical signal it receives from pixel $150_{13}$—via optical signal path 36—with a sample of the reference signal the combiner receives via paths 20 and 22. Therefore, each combiner is adapted to combine a sample of the reference signal with an optical signal received from the combiner's associated pixel.

As described above, each combiner combines the signal it receives from its associated pixel with a sample of the reference signal to generate a combined signal that in one embodiment is representative of the sum of these two signals. For example, assume that the signal received by combiner 40 from pixel $150_{11}$ is represented by A, and the sample of reference signal received by combiner 40 is represented by B. Optical signals A and B travel in two different paths and thus experience different time delays. Hence, since the light source 135 is frequency chirped, signals A and B will have different frequencies at the input of the combiner 40. The optical signal representative of the sum of these two optical signals (A+B) is applied to a photodiode. For example, photodiode 50 is shown as receiving the optical output signal (A+B) of combiner 40; and photodiode 52 is shown as receiving the optical output signal of combiner 42. Each photodiode is adapted to generate a signal representative of nearly the square of the signal it receives. For example, in response to the received signal (A+B), photodiode 50 generates a signal defined by $(A+B)^2$, which is equivalent to: $A^2+B^2+2AB$ Since signals A and B are optical signals, signals $A^2$ and $B^2$ have relatively very high frequencies that are outside the frequency response range of the photodiodes and are thus filtered out. The product AB represents a mixing of signals A and B. The Fourier transform of the product of two time-domain sinusoidal signals A and B, has two frequencies positioned at frequencies A+B and A−B. The frequency of the signal component defined by A+B is relatively high and outside the frequency response range of the photodiodes and is thus filtered out.

The remaining frequency component of the photodiode current, namely A−B which represents the difference between the frequency of the reference signal and the received signal, is within the frequency response range of the photodiode. Accordingly, the frequency, phase, and amplitude of the photodiode current associated with each pixel is used to represents the distance from the camera of a region of the object reflecting the optical signal that is captured by that pixel. In one embodiment, the camera can achieve 100 μm depth or spatial resolution by processing the frequency and phase of the photodiode current. Currents $I_1$, $I_2$, $I_3$, $I_4$ generated respectively by photodiodes 50, 52, 54, and 56 are applied to a control and signal processing system 200 adapted to implement an algorithm for determining the relative position of an image captured by each pixel relative to the positions of the remaining images captured by the other pixels. Although FIG. 2 is shown as having four pixel and four associated photodiodes for simplicity, it is understood that coherent camera 100 of FIG. 1, has i×j pixels each having an associated photodiode (i.e., i×j photodiodes), where i and j may be any integers.

Figure 3:
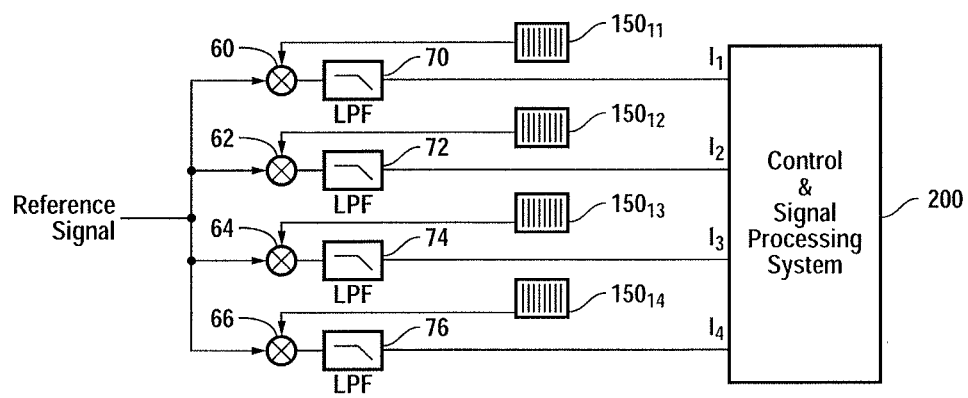
FIG. 3 is an exemplary equivalent circuit diagram of the components and signal paths shown in FIG. 2.

FIG. 3 is an exemplary equivalent circuit diagram of the components and signal paths shown in FIG. 2. Combiners 40, 42, 44, 46 together with photodiodes 50, 52, 54, 56 of FIG. 2 are equivalently represented as mixers 60, 62, 64, 66, and low-pass filters 70, 72, 74, 76. Each mixer performs a mixing operation to provide, for example, the product of a sample of a reference signal and a received signal. The low-pass filters perform the filtering operations that filter out the high frequency components of the signal generated by the photodiodes. For example, as described above, the low-pass filters filter out the high frequency components associated with signals $A^2$, $B^2$, and A+B, while passing the frequency component associated with signal A−B.

Figure 7:
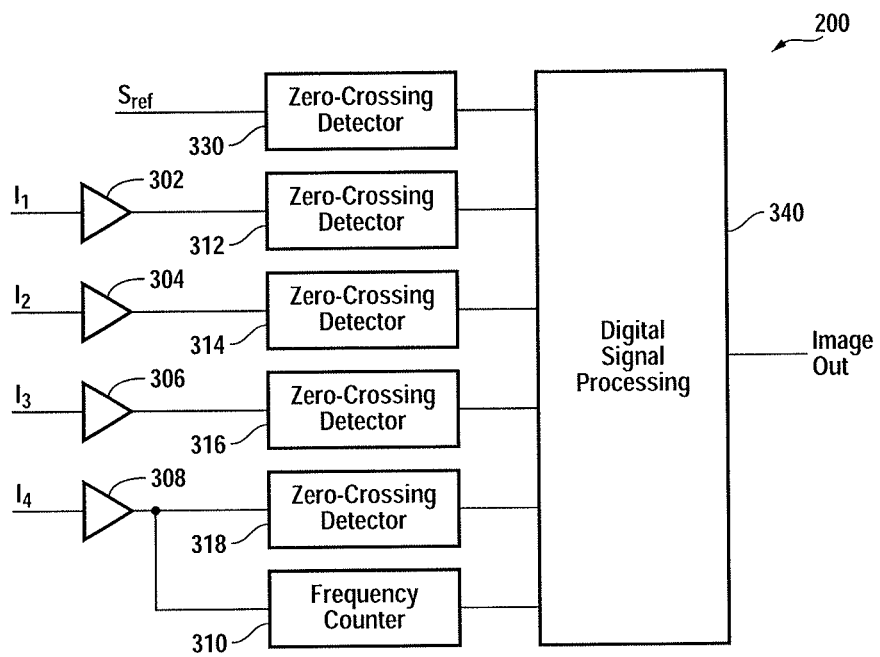
FIG. 7 is a simplified block diagram of a signal processing system used in a coherent camera, in accordance with one embodiment of the present invention.

As was described above, control and signal processing system 200 is adapted to execute an algorithm designed to determine the relative positions of various points of a target object as captured by the pixels. To achieve this, control and signal processing system 200 may perform any one of a number of linear or non-linear transformations. FIG. 7 is a simplified block diagram of a signal processing system 200, in accordance with one embodiment of the present invention. Although the signal processing system of FIG. 7 is shown as having only four signal processing paths processing the currents signals associated with only four photodiodes, namely $I_1$, $I_2$, $I_3$ and $I_4$ (see also FIG. 2) it is understood that a signal processing system disposed in a coherent camera in accordance with the present invention may have i×j signal processing paths, with i and j representing the number of pixels disposed along the rows and columns of the pixel array, as described above.

Figure 8:
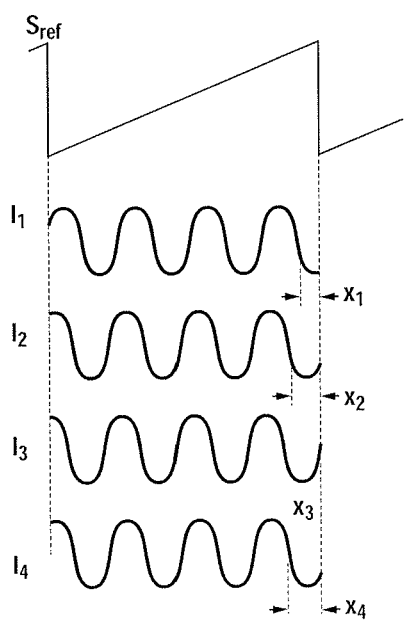
FIG. 8 shows the phases of a number of current waveforms relative to that of a reference signal as detected by the signal processing system, in accordance with one exemplary embodiment of the present invention.

In the embodiment shown in FIG. 7, the course spatial position of the various points of the target object is determined by detecting the frequency of one of the currents (e.g. $I_4$) using a frequency counter 310. Fine spatial resolution of the various point of the target object is determined by comparing the phase of each current waveform to the time-varying electrical reference signal $S_{ref}$ using digital signal processing unit 340. The phase of each such current waveform relative to that of the reference signal $S_{ref}$ is detected using zero-crossing detector blocks 312, 314, 316, 318, 330. FIG. 8 shows exemplary waveforms of the reference signal $S_{ref}$ and current waveforms $I_1$, $I_2$, $I_3$ and $I_4$. As is seen from FIG. 8, current waveforms $I_1$, $I_2$, $I_3$ and $I_4$ are shown as having detected phases of $x_1$, $x_2$, $x_3$ and $x_4$ relative to reference signal $S_{ref}$.

In accordance with another embodiment, the zero-crossing detectors disposed in control and signal processing system 200 are used to find the frequency of the current waveform associated with each photodiode. In accordance with yet another embodiment of the control and signal processing system 200, the photodiode current waveforms are digitized and supplied to a Fourier transform block configured to determine the frequency of the current generated by each photodiode.

In accordance with one linear transformation, the algorithm sets the frequency of the photodiode associated with one of the pixels, e.g. pixel $15_{11}$ as the reference frequency. The algorithm then subtracts the frequency associated with the remaining (i×j−1) pixels from the reference frequency to determine the distance by which the images captured by the remaining (i×j−1) pixels are, for example, ahead or behind the image captured by the reference pixel, thereby to form a 3D image of the target object. It is understood that control and signal processing system 200 may use any other linear or non-linear transformation algorithm to make such determinations by using the frequency of the currents generated by the photodiodes.

Figure 4:
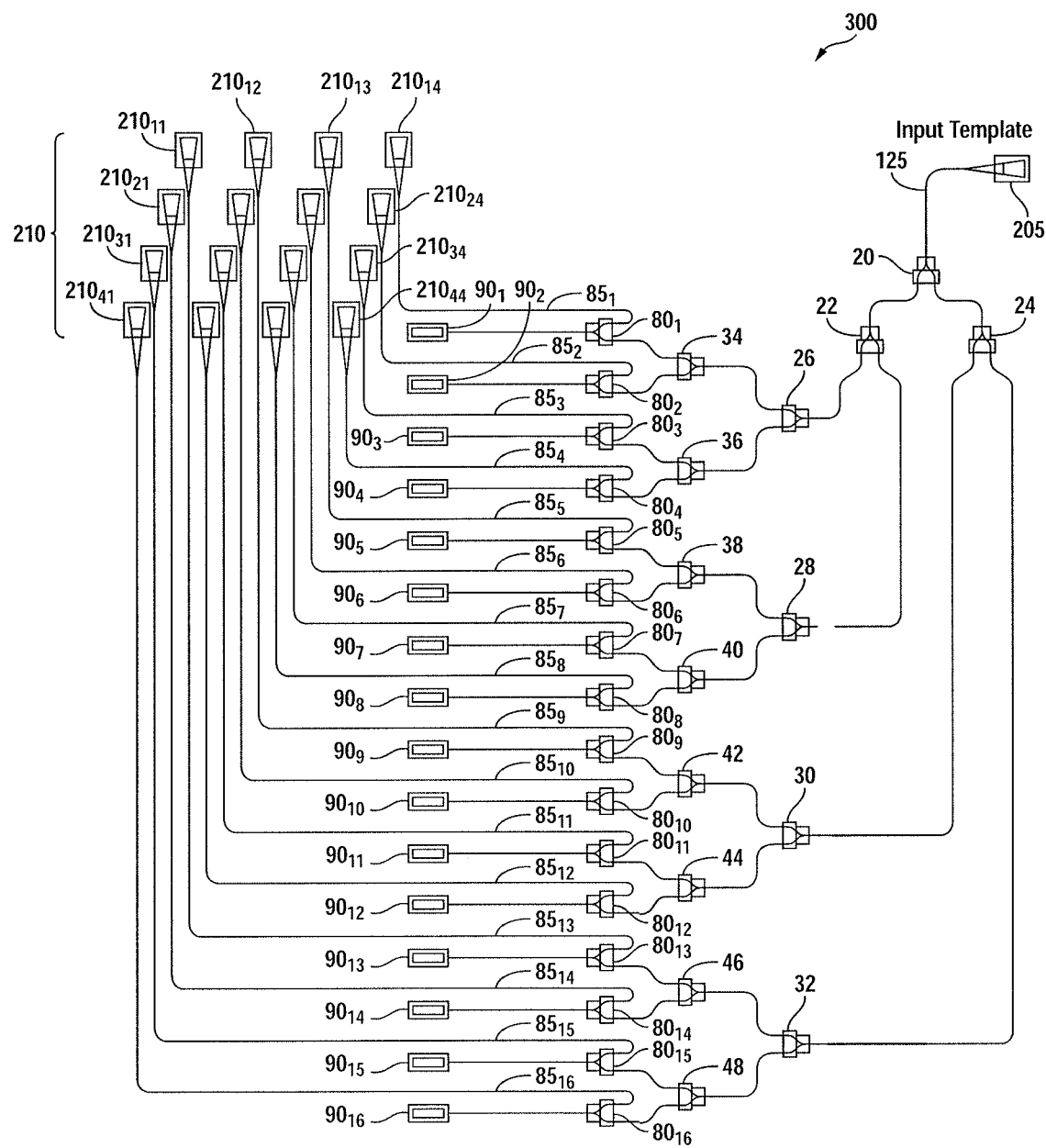
FIG. 4 is a schematic view of a number of components of coherent camera, in accordance with one exemplary embodiment of the present invention.

FIG. 4 is a schematic view of a number of components of coherent camera 300 formed in a semiconductor substrate 500, using for example a silicon-on-insulator process, in accordance with one exemplary embodiment of the present invention. Coherent camera 300 is shown as including a 4×4 array of pixels for simplicity. It is understood, however, that coherent camera 200 may include an N×M array of pixels, where N and M are any positive integers. Coherent camera 200 is also shown as including, in part, an input source 205 generating reference signal 125, signal splitters 20, 22, 24, 26, 28, 30, 32, 34, 36, 38, 40, 42, 44, 46, 48, combiners $80_k$, wherein k is an integer ranging from 1 to 16 in this exemplary embodiment, and photodiodes $90_k$. In one embodiment, each splitter may be a Y-junction, and input signal source 135 may be a laser that may or may not be integrated on substrate 500. Coherent camera 300 also includes a number of optical signal channels that deliver the optical signals received by the pixels as well as the different samples of the reference signal to the combiners, as described further below.

The reference signal 125 generated by input source 205 is split multiple times to generate multiple samples which are delivered to combiners $80_k$. For example, reference signal 125 after being split by splitters 20, 22, 26, 34 is delivered to optical signal combiners $80_1$ and $80_2$. Likewise, the samples of the reference signal 125 that are delivered to combiners $80_9$ and $80_{10}$ are generated by splitters 20, 24, 30, and 42. Each combiner is also adapted to receive a signal from an associated pixel. For example, in the embodiment shown in FIG. 4, combiner $80_1$ receives the signal from its associated pixel $210_{14}$ via optical channel $85_1$; and combiner $810_{16}$ receives the signal from its associated pixel $210_{41}$.

Each combiner is adapted to combine the signal it receives from its associated pixel with a sample of the reference signal to generate and deliver the combined signal to an associated photodiode. For example, combiner $80_1$ combines the signal it receives from associated pixel $210_{14}$ with the sample of the reference signal it receives from coupler 34 to generate a combined signal that it delivers to photodiode $90_1$. Likewise, for example, combiner $80_4$ combines the signal it receives from associated pixel $210_{44}$ with the sample of the reference signal it receives from coupler 36 to generate a combined signal that it delivers to photodiode $90_4$.

As was described above, in one embodiment, the combined signal generated by each combiner is the sum of the two signals that the combiner receives. The signal generated by each combiner $80_k$ is delivered to an associated photodiode $90_k$. In response, each photodiode $90_k$ generates a current whose frequency is defined by the difference between the frequencies of the signals that the photodiode's associated combiner receives, as described above in connection with FIG. 2.

Coherent camera 300 also includes a control and signal processing system (not shown in FIG. 4) adapted to form a 3D image of a target object by determining the relative positions of an image captured on each pixel using the frequency of the currents generated by the pixel's associated photodiode. To achieve this, as was described above in reference to FIG. 2, the control and signal processing executes an algorithm to determine the relative positions of various points of an object as captured by the pixels. For example, in accordance with one linear transformation, the algorithm sets the current frequency of the photodiode associated with pixel $210_{11}$ as the reference frequency. The algorithm, knowing the distances between various pixels, subtracts the frequency of the photodiode currents associated with the remaining pixels from the reference frequency to determine the distance by which the images captured by the remaining pixels are, for example, either behind or ahead of the image of the reference pixel, thereby to form a 3D image of the target object. It is understood that the control and signal processing system may use any other linear or non-linear algorithm to determine the relative positions of the images captured by the pixels by using the frequency of the currents generated by their associated photodiodes.

Figure 5:
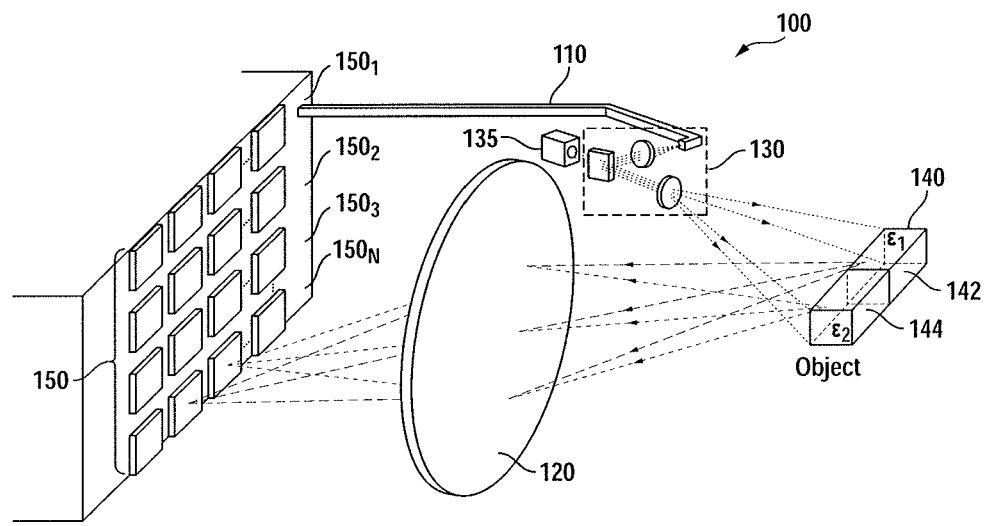
FIG. 5 shows the coherent camera of FIG. 1 positioned to form a phase contrast view of an object having different dielectric constants, in accordance with one exemplary embodiment of the present invention.

FIG. 5 shows coherent camera 100 positioned to capture a view of object 140 that includes a first portion 142 having a dielectric constant of $\varepsilon_1$, and a second portion 144 having a dielectric constant of $\varepsilon_2$. Since the phase and amplitude of the signal received by each pixel is indicative of the dielectric constant of the object from which the signal is reflected off of, coherent camera 100, in accordance with embodiments of the present invention, is also adapted to form an image by comparing and contrasting the phases of the received signals. In other words, because the dielectric constants of regions 142 and 144 are different, the phases/frequency of the signals received by the pixels from regions 142 and 144 are also different. The phase differences so detected by coherent camera 100 are used by control and signal processing 200 to form a phase contrast view of object 140. Consequently, a coherent camera 100, in accordance with embodiments of the present invention, is adapted to detect both frequency shifts as well as phase shifts to form a phase contrast views of the objects.

Figure 6:
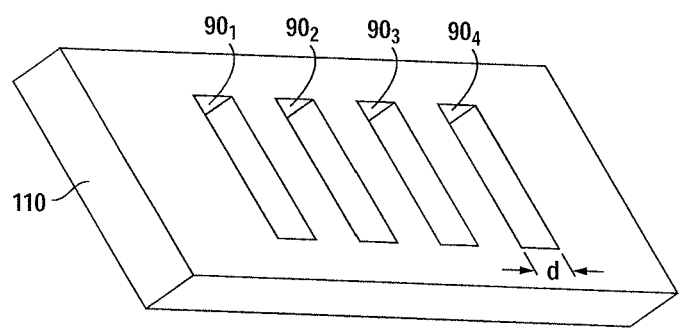
FIG. 6 is a perspective view of one of the pixels disposed in the coherent camera of FIG. 1, in accordance with one exemplary embodiment of the present invention.

FIG. 6 is a perspective view of an exemplary embodiment of the pixels used in pixel array 150 of coherent camera 100 of FIG. 1. The pixel shown in FIG. 6 is an optical grating shown as including four similarly sized grooves $30_1$, $30_2$, $30_3$ and $30_4$. Although the exemplary optical grating is shown as including four grooves, it is understood that the optical grating may have more or fewer than four groves.

The above embodiments of the present invention are illustrative and not limitative. Embodiments of the present invention are not limited by the number of pixels in the pixel array, the wavelength of the optical source that generates a reference signal, the type of frequency transformation, the type of optical signal splitter, combiner, optical waveguide, and the like. Embodiments of the present invention are not limited by the number or shape of grooves in each pixel, nor are they limited by the type of optical-to-electrical signal converter, photodiode or otherwise, used to convert the optical signal to an electrical signal. Embodiments of the present invention are not limited by the type of substrate, semiconductor or otherwise, in which various optical and electrical components of the camera are formed. Other additions, subtractions or modifications are obvious in view of the present disclosure and are intended to fall within the scope of the appended claims.

What is claimed is:

1. A camera comprising:
   an optical signal source generating a signal;
   a plurality of pixels arranged along N rows and M columns, where M and N are integer numbers;
   an optical lens adapted to focus a reflected signal directly toward the plurality of pixels thereby enabling the plurality of pixels to receive the reflected signal, said reflected signal being generated by causing a reflection of a first portion of the optical signal from a target object; and
   an opto-electronic circuit adapted to combine a second portion of the optical signal with the signals received by at least a subset of the plurality of pixels to generate data representative of an image of the target object, wherein said opto-electronic circuit comprises:
   a plurality of splitters adapted to generate a plurality of samples of the second portion of the optical signal; and
   a plurality of combiners each adapted to combine a sample of the second portion of the optical signal with a signal received from a different one of the plurality of pixels, thereby to generate a plurality of combined optical signals.

2. The camera of claim 1 further comprising:
   an optical system adapted to direct the first portion of the optical signal toward the target object.

3. The camera of claim 1 wherein said optical signal source is a laser.

4. The camera of claim 1 further comprising:
   a plurality of opto-electronic components each associated with a different one of the combiners and a different one of the pixels and adapted to convert the combined optical signal it receives from its associated combiner to an electrical signal.

5. The camera of claim 4 wherein each opto-electronic component is a photo-diode adapted to generate a current signal whose frequency is defined by a difference between a frequency of the second portion of the optical signal and a frequency of the signal the photo-diode receives from its associated pixel.

6. The camera of claim 5 wherein said camera further comprises a signal processing system adapted to determine data representative of the image of the target object by comparing the plurality of frequencies of the current signals generated by the plurality of photodiodes.

7. The camera of claim 6 wherein each of the photodiodes is adapted to filter out high frequency components of the signals it receives.

8. The camera of claim 1 further comprising:
   an optical path adapted to deliver the second portion of the optical signal to the optical system.

9. The camera of claim of 6 wherein the plurality of pixels, the plurality of splitters, the plurality of combiners, the plurality of opto-electronic components and the signal processing system are formed on a semiconductor substrate.

10. The camera of claim of 9 wherein said optical signal source is formed on the semiconductor substrate.

11. The camera of claim 1 wherein said image is a 3-D image.

12. The camera of claim 1 wherein the optical signal generated by the optical signal source has a variable frequency.

13. The camera of claim 1 wherein each of the plurality of pixels comprises a grating coupler.

14. A method of forming an image of a target object, the method comprising:

generating an optical signal;
directing a first portion of the optical signal toward the target object to generate a reflected optical signal;
focusing the reflected optical signal via an optical lens directly onto a plurality of pixels arranged along rows and columns thereby enabling the plurality of pixels to receive the reflected optical signal; and
combining a second portion of the optical signal with the signals received by at least a subset of the plurality of pixels thereby to generate data representative of the image of the target object, wherein said combining further comprises:
generating a plurality of samples of the second portion of the optical signal; and
combining each sample of the second portion of the signal with a different one of the plurality of signals received by the pixels thereby to generate a plurality of combined optical signals.

15. The method of claim 14 further comprising:
generating the optical signal using a laser.

16. The method of claim 14 further comprising:
converting the plurality of combined optical signals to a plurality of electrical signals.

17. The method of claim 16 wherein a frequency of each one of the plurality of electrical signals is defined by a difference between a frequency of the second portion of the optical signal and a frequency of the signal received from a different one of the plurality pixels.

18. The method of claim 16 further comprising:
comparing the plurality of frequencies of the electrical signals to form the data representative of the image of the target object.

19. The method of claim 18 further comprising:
filtering out high frequency components of the electrical signals.

20. The method of claim 14 further comprising:
delivering the first portion of the optical signal toward the target object via an optical system.

21. The method of claim 18 further comprising:
generating the optical signal using an optical source formed on a semiconductor substrate; and
forming the plurality of pixels on the semiconductor substrate.

22. The method of claim 18 wherein the plurality of pixels are formed on a semiconductor substrate using a silicon-on-insulator process.

23. The method of claim 14 wherein the optical signal has a variable frequency.

24. The method of claim 14 wherein each of the plurality of pixels comprises a grating coupler.

* * * * *